(12) United States Patent
Muzyka et al.

(10) Patent No.: US 6,283,536 B1
(45) Date of Patent: Sep. 4, 2001

(54) PICKUP TRUCK FOLDING CAMPER SYSTEM

(75) Inventors: Yaroslow I. Muzyka; Maria D. Muzyka, both of Winnipeg (CA)

(73) Assignee: Engineers on Wheels Inc. (CA)

( * ) Notice: Subject to any disclaimer, the term of this patent is extended or adjusted under 35 U.S.C. 154(b) by 0 days.

(21) Appl. No.: 09/640,490

(22) Filed: Aug. 16, 2000

(51) Int. Cl.$^7$ ................................................ B60P 3/345

(52) U.S. Cl. .......................................... 296/165; 296/174

(58) Field of Search ................................. 296/165, 169, 296/173, 174, 26.02, 26.05, 26.12, 26.15; 135/88.05

(56) References Cited

U.S. PATENT DOCUMENTS

| | | | |
|---|---|---|---|
| 3,466,082 | * 9/1969 | Branch | 296/165 X |
| 4,294,484 | * 10/1981 | Robertson | 296/174 X |
| 6,170,502 | * 1/2001 | Pullen | 296/174 X |

* cited by examiner

Primary Examiner—Dennis H. Pedder

(57) ABSTRACT

A pickup truck folding camper system for folding into a compact position during nonuse and for expanding into a spacious camper while positioned upon a pickup. The inventive device includes a frame formed to fit within the bed of a pickup, a plurality of corner jacks removably attached to the frame, a plurality of telescoping support poles extending upwardly from the frame supporting a roof, a pair of support wings pivotally attached to opposing sides of the frame, middle enclosures for enclosing a middle portion between the roof and the frame, and a pair of end enclosures for enclosing the opposing side portions of the support wings. A lower opening within the frame enclose by a full door provides access to the interior of the frame when the roof is extended upwardly. A partial door is utilized to enclose the lower opening when the roof is contracted upon the frame in the storage position. A pair of support arms preferably extend upwardly from the corner jacks to engage and support a pair extended members that support the support wings on opposing sides of the frame.

12 Claims, 7 Drawing Sheets

PICKUP TRUCK FOLDING CAMPER SYSTEM

BACKGROUND OF THE INVENTION

1. Field of the Invention

The present invention relates generally to pickup camper devices and more specifically it relates to a pickup truck folding camper system for folding into a compact position during nonuse and for expanding into a spacious camper while positioned upon a pickup.

2. Description of the Prior Art

Camper devices have been in use for years. Typically, a conventional camper has a floor, front and rear walls, side walls and a roof forming a rigid and rectangular structure. For conventional campers designed to fit upon a conventional pickup, the main problem is that the overall width is limited because of road restrictions and safety concerns.

Therefore, the interior portion of a conventional camper designed for a conventional pickup is typically not comfortable for extended stays. In addition, many conventional campers have a width that is much wider that the pickup making it difficult to navigate around objects. Also, the overhang is dangerous to individuals walking around the conventional camper when not in use because they may engage the overhang with their bodies.

Examples of patented camper include U.S. Pat. No. 3,658,375 to Bowen; U.S. Pat. No. 4,220,370 to Rice; U.S. Pat. No. 4,294,484 to Robertson; U.S. Pat. No. 4,444,429 to Dawes; U.S. Pat. No. 4,542,911 to Mulligan; U.S. Pat. No. 4,542,932 to Whiteman; U.S. Pat. No. 4,784,429 to Hodges; U.S. Pat. No. 4,807,924 to Kottke; U.S. Pat. No. 4,918,772 to Haile; U.S. Pat. No. 5,335,960 to Benignu, Jr.; U.S. Pat. No. 3,823,974 to Patnode; U.S. Pat. No. 5,421,633 to Moore et al.; U.S. Pat. No. 5,462,330 to Brown; and U.S. Pat. No. 5,549,067 to Jolin which are all illustrative of such prior art.

While these devices may be suitable for the particular purpose to which they address, they are not as suitable for folding into a compact position during nonuse and for expanding into a spacious camper while positioned upon a pickup. Conventional campers are difficult to navigate a pickup with because they block view with the side mirrors. Also, conventional campers are prone to engaging objects near the vehicle making them a hazard.

In these respects, the pickup truck folding camper system according to the present invention substantially departs from the conventional concepts and designs of the prior art, and in so doing provides an apparatus primarily developed for the purpose of folding into a compact position during nonuse and for expanding into a spacious camper while positioned upon a pickup.

SUMMARY OF THE INVENTION

In view of the foregoing disadvantages inherent in the known types of camper devices now present in the prior art, the present invention provides a new pickup truck folding camper system construction wherein the same can be utilized for folding into a compact position during nonuse and for expanding into a spacious camper while positioned upon a pickup.

The general purpose of the present invention, which will be described subsequently in greater detail, is to provide a new pickup truck folding camper system that has many of the advantages of the camper devices for pickups mentioned heretofore and many novel features that result in a new pickup truck folding camper system which is not anticipated, rendered obvious, suggested, or even implied by any of the prior art camper devices, either alone or in any combination thereof.

To attain this, the present invention generally comprises a frame formed to fit within the bed of a pickup, a plurality of corner jacks removably attached to the frame, a plurality of telescoping support poles extending upwardly from the frame supporting a roof, a pair of support wings pivotally attached to opposing sides of the frame, middle enclosures for enclosing a middle portion between the roof and the frame, and a pair of end enclosures for enclosing the opposing side portions of the support wings. A lower opening within the frame enclosed by a full door provides access to the interior of the frame when the roof is extended upwardly. A partial door is utilized to enclose the lower opening when the roof is contracted upon the frame in the storage position. A pair of support arms preferably extend upwardly from the corner jacks to engage and support a pair of extended members that support the support wings on opposing sides of the frame.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a pickup truck folding camper system that will overcome the shortcomings of the prior art devices.

A second object is to provide a pickup truck folding camper system for folding into a compact position during nonuse and for expanding into a spacious camper while positioned upon a pickup.

Another object is to provide a collapsible portable camper system that folds into a compact storage position.

An additional object is to provide a collapsible portable camper system that expands forming a spacious interior for individuals to utilize.

A further object is to provide a collapsible portable camper system that is removably positionable upon a conventional pickup.

Another object is to provide a collapsible portable camper system that does not interfere with the normal operation of the pickup while attached to the pickup.

An additional object is to provide a collapsible portable camper system that is easily extended and retracted by a single user.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
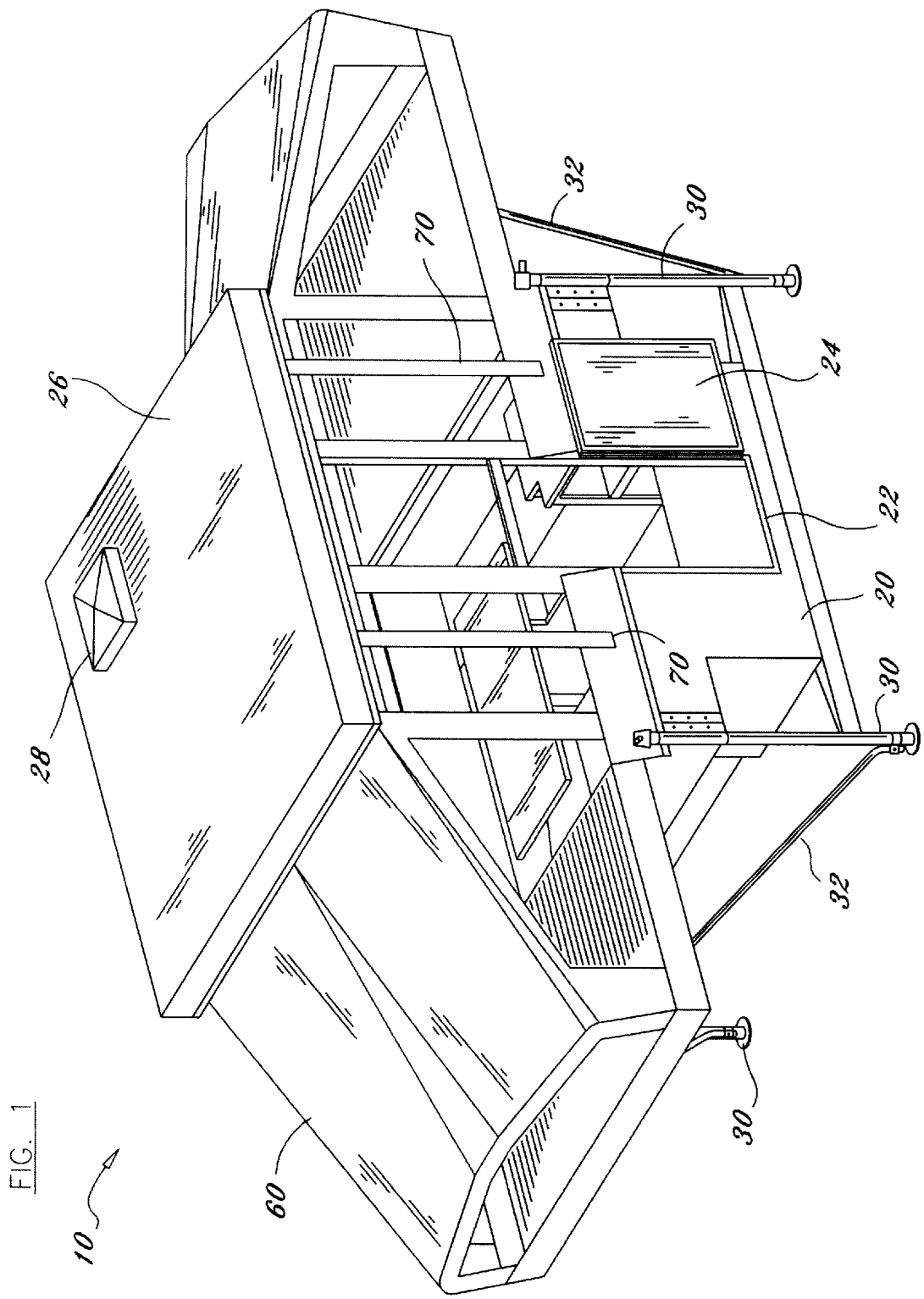
FIG. 1 is an upper perspective view of the present invention in an opened position.

Turning now descriptively to the drawings, in which similar reference characters denote similar elements throughout the several views, FIGS. 1 through 7 illustrate a pickup truck folding camper system 10, which comprises a frame 20 formed to fit within the bed of a pickup 12, a plurality of corner jacks 30 removably attached to the frame 20, a plurality of telescoping support poles 40 extending upwardly from the frame 20 supporting a roof 26, a pair of support wings 50 pivotally attached to opposing sides of the frame 20, middle enclosures 70 for enclosing a middle portion between the roof 26 and the frame 20, and a pair of end enclosures 60 for enclosing the opposing side portions of the support wings 50. A lower opening 22 within the frame 20 enclose by a full door 25 provides access to the interior of the frame 20 when the roof 26 is extended upwardly. A partial door 24 is utilized to enclose the lower opening 22 when the roof 26 is contracted upon the frame 20 in the storage position. A pair of support arms 32 preferably extend upwardly from the corner jacks 30 to engage and support a pair of extended members 34 that support the support wings 50 on opposing sides of the frame 20.

Figure 2:
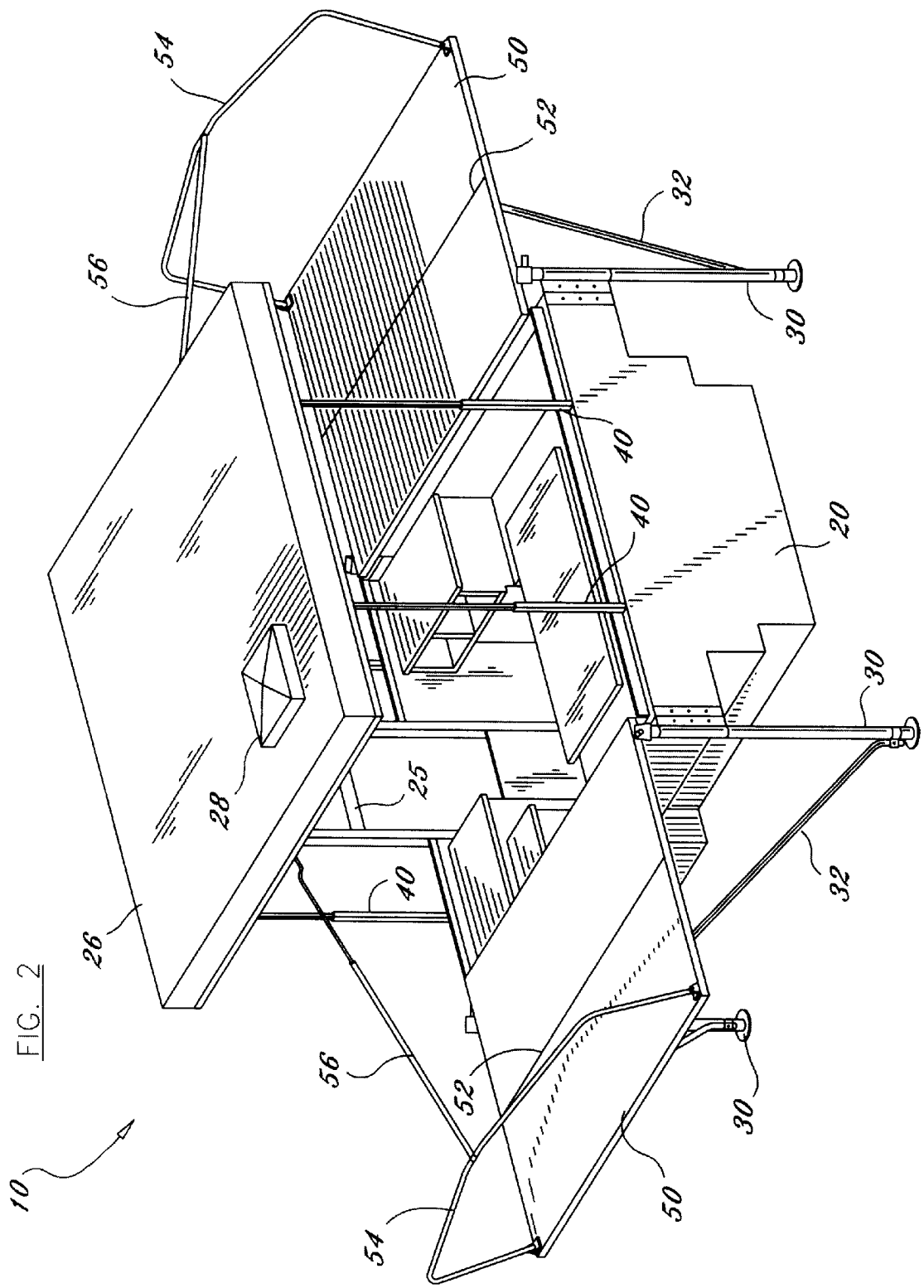
FIG. 2 is an upper perspective view of the present invention in the opened position with the canopy removed.
Figure 3:
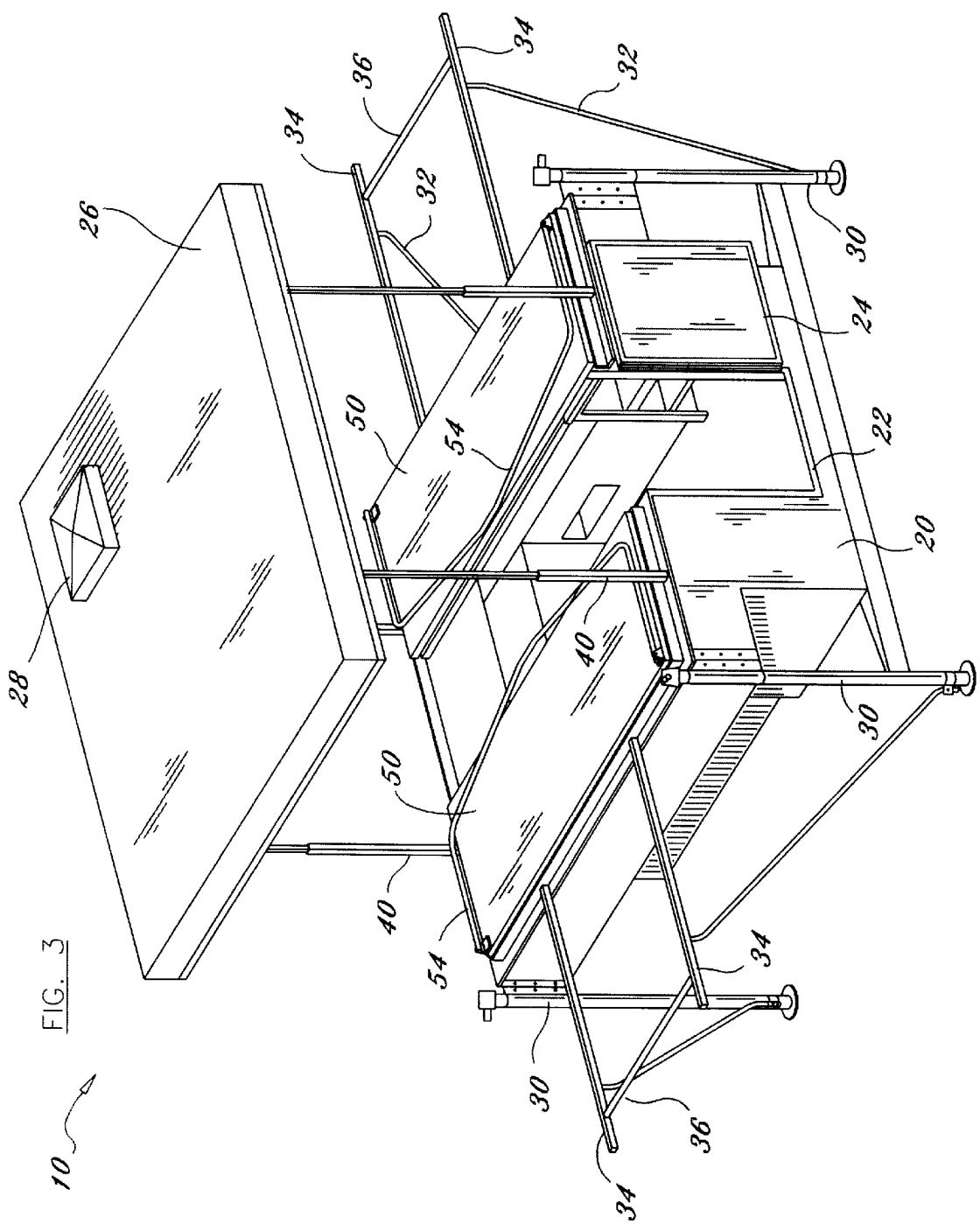
FIG. 3 is an upper perspective view of the present invention partially opened with the roof extended upwardly.

As shown in FIGS. 1 through 7 of the drawings, the frame 20 is a rigid structure formed to fit within a rear portion of a pickup 12 and more particularly with the bed of the pickup 12. The frame 20 has a longitudinal axis that extends parallel to a longitudinal axis of the pickup 12. The frame 20 is formed as to be positionable about the raised wheel wells of the bed of the pickup 12. The frame 20 has an open upper portion as best shown in FIGS. 1 through 3 of the drawings. The frame 20 may be constructed of any well-known rigid material as can be appreciated.

Figure 4:
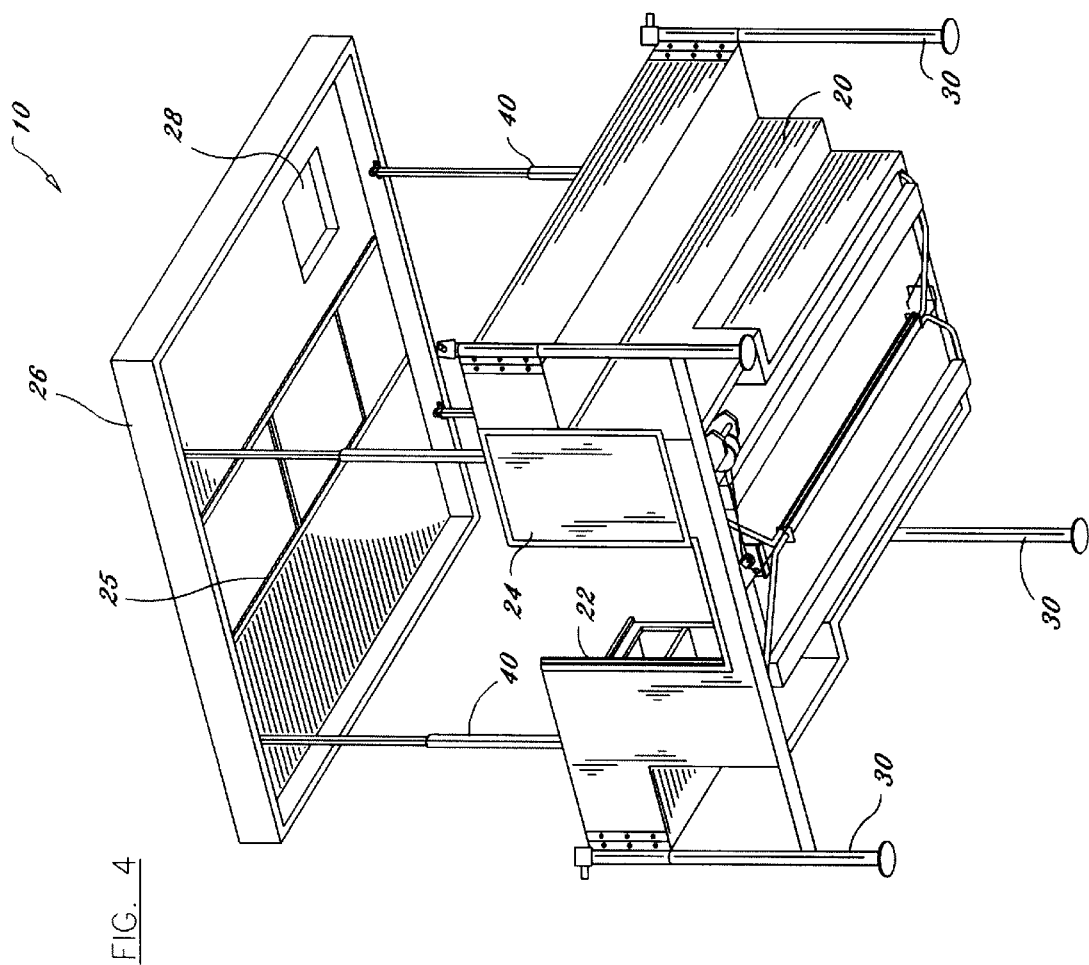
FIG. 4 is a lower perspective view of the present invention partially opened with the roof extended upwardly.
Figure 5:
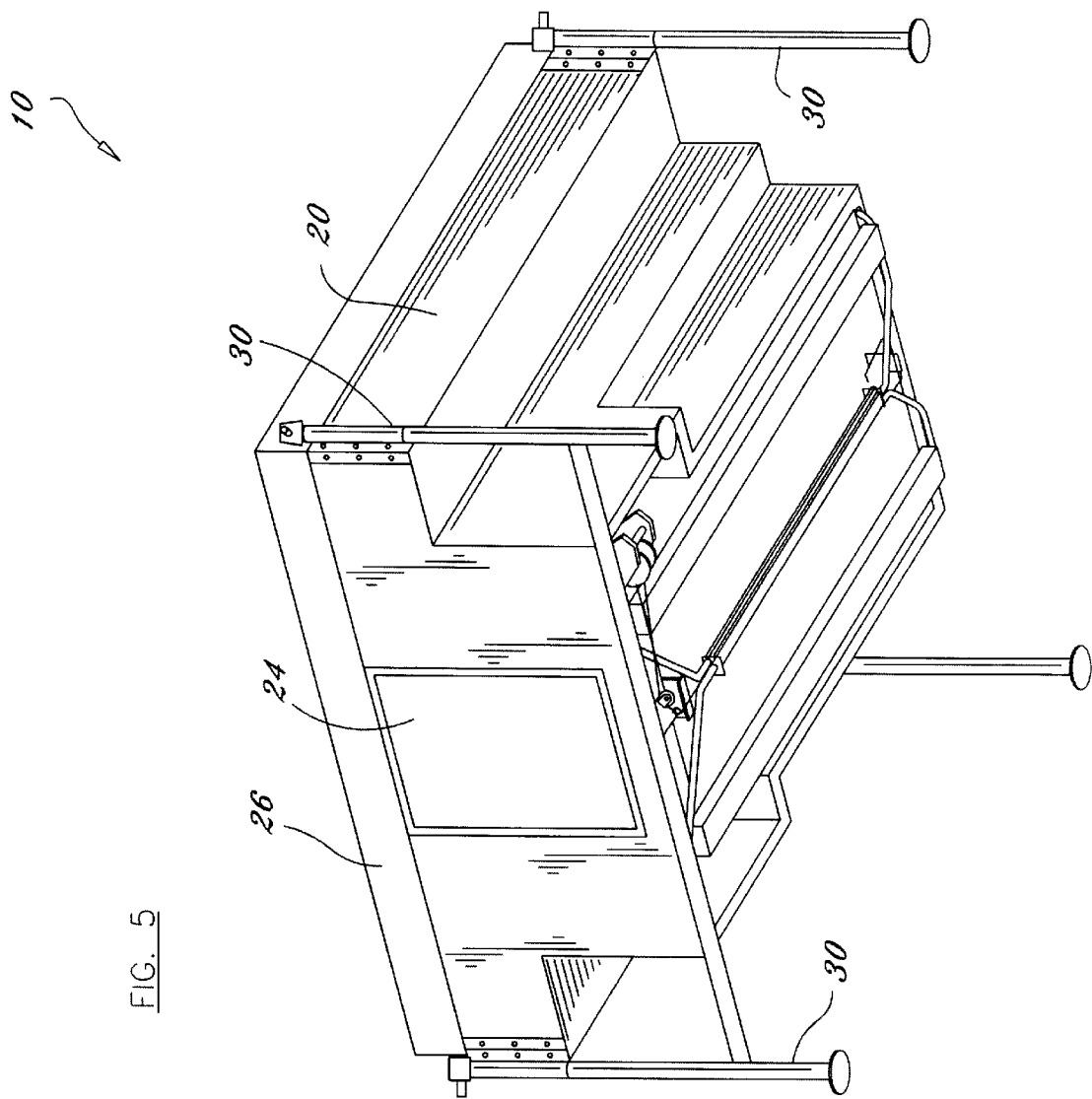
FIG. 5 is a lower perspective view of the present invention in a closed position.
Figure 6:
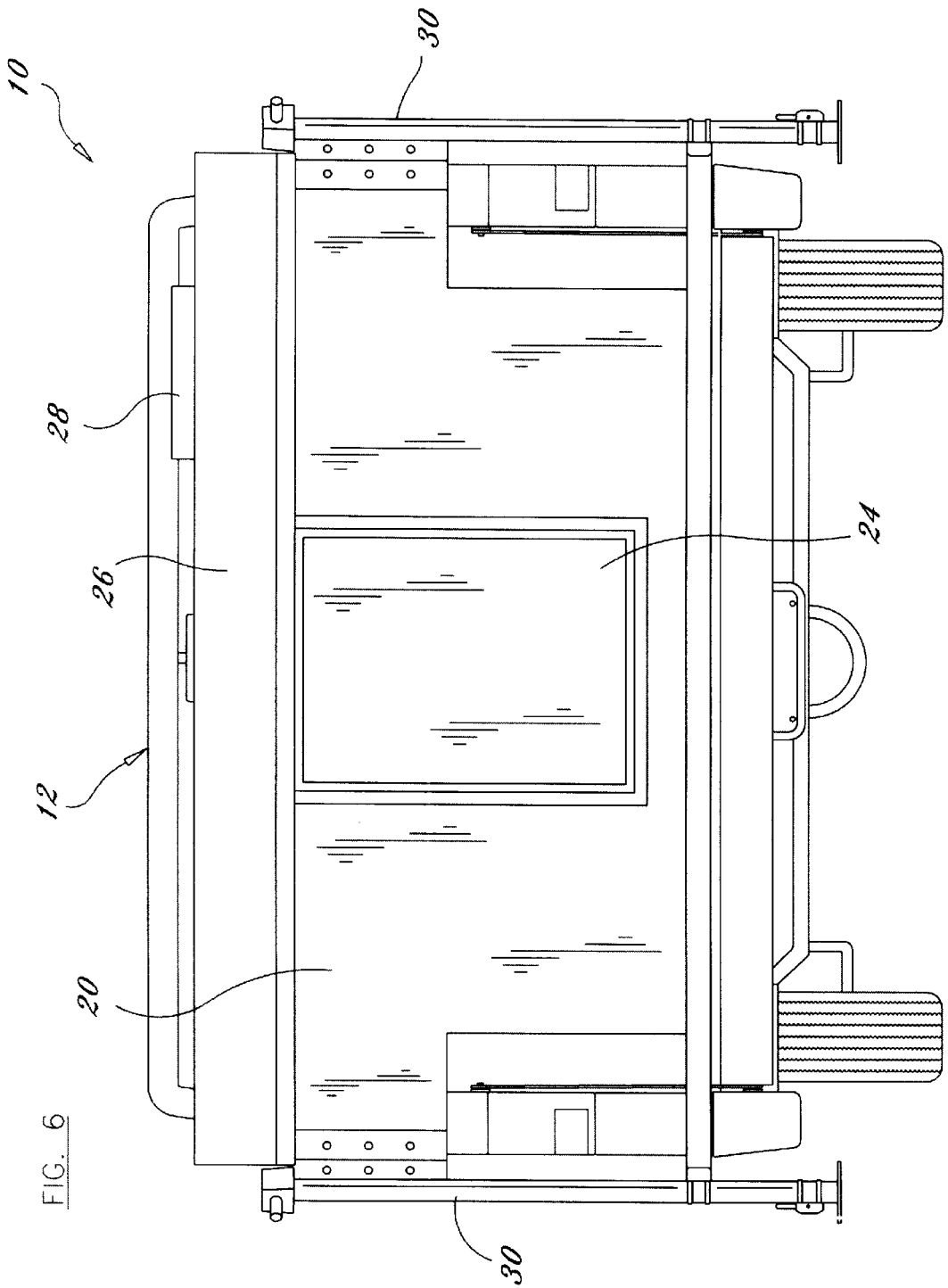
FIG. 6 is a rear view of the present invention positioned within the bed of a pickup.
Figure 7:
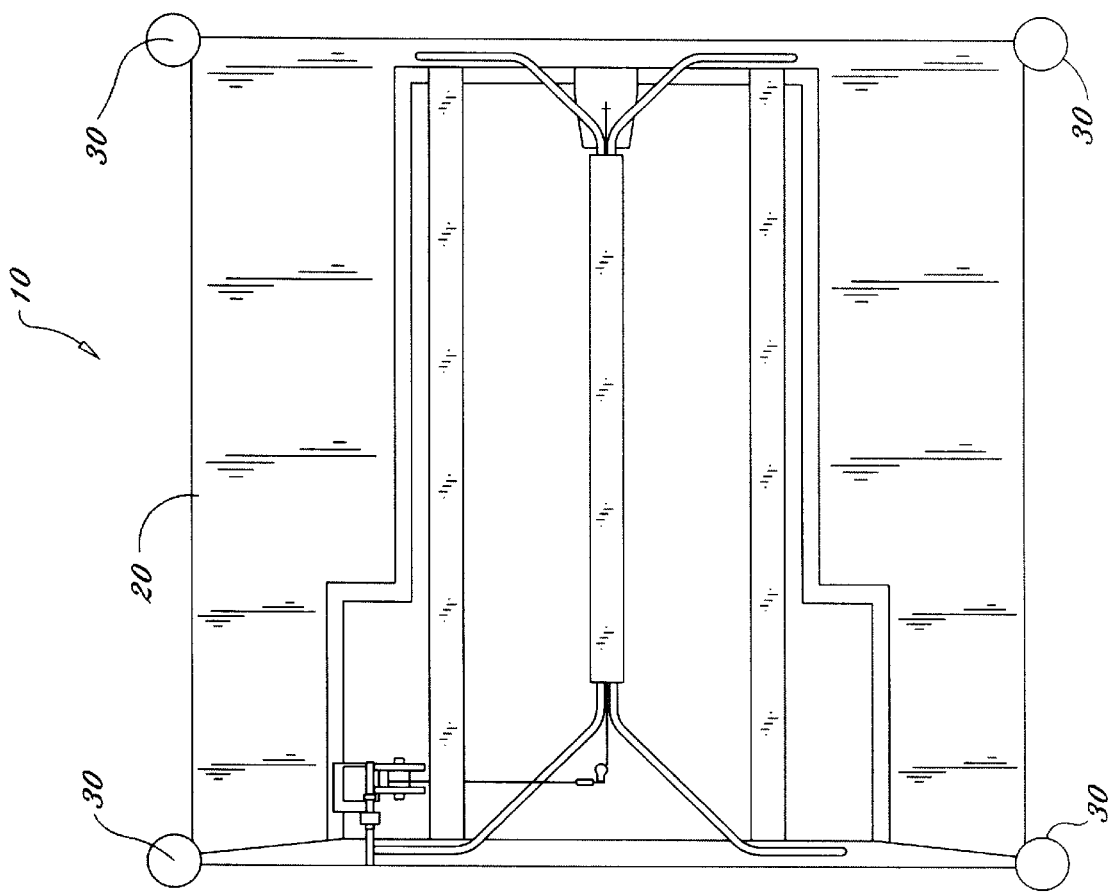
FIG. 7 is bottom view of the present invention.

As shown in FIGS. 1, 3 and 4 of the drawings, the frame 20 includes a lower opening 22 providing access to the interior of the frame 20. The lower opening 22 is enclosed by a partial door 24 when the present invention is within the storage position as best shown in FIG. 5 of the drawings. A full door 25 is pivotally attached to the roof 26 that is extended downwardly to enclose the lower opening 22 and a space between the lower opening 22 and the roof 26 when the roof 26 is extended upwardly as best shown in FIGS. 2 and 4 of the drawings. The full door 25 preferably has a vertically adjustable hinge that allows the vertical position of the full door 25 to be adjusted in relation to the roof 26 thereby allowing compensation by a user for various heights of the roof 26 with respect to the frame 20 and lower opening 22 within the frame 20.

As shown in FIGS. 1 through 7 of the drawings, a plurality of corner jacks 30 are removably attached to the frame 20. The plurality of corner jacks 30 are preferably attached adjacent the corner portions of the frame 20, however it can be appreciated that the corner jacks 30 may be attached along various locations of the frame 20. The corner jacks 30 are removably attached to the frame 20 to allow removal when positioned within the bed of the pickup 12. The corner jacks 30 are reattached when the frame 20 is to be supported above a ground surface. The corner jacks 30 are comprised of any well-known elevating structure such as screw jacks and the like.

As shown in FIGS. 2 through 4 of the drawings, a plurality of telescoping support poles 40 are attached within the frame 20 and support the roof 26 with respect to the frame 20. The telescoping support poles 40 are extendable upwardly by any well-known telescoping structure as is readily available. The telescoping support poles 40 vertically lift the roof 26 with respect to the frame 20 as shown in FIGS. 2 through 4 of the drawings.

As shown in FIGS. 1 through 5 of the drawings, the roof 26 is formed to enclose the upper opening of the frame 20 when in the storage position. The roof 26 may be constructed of any well-known material. The roof 26 preferably includes a vent 28 as best shown in FIGS. 1 through 4 of the drawings to allow adequate ventilation of the structure when in the storage and extended position.

As best shown in FIG. 3 of the drawings, a pair of extended members 34 are extendible horizontally from opposing side portions of the frame 20. A corresponding pair of support arms 32 extend upwardly from the corner jacks 30 to the outer portions of the extended members 34 to provide additional support to the extended members 34. A cross member 36 preferably extends between each of the pairs of extended members 34 to provide additional support.

As best shown in FIG. 2 of the drawings, two opposing support wings 50 are pivotally attached to the upper side portions of the frame 20. The support wings 50 are flat structures that extend outwardly when the roof 26 is elevated to support one or more beds for individuals. The support wings 50 preferably include a central hinge section 52 that allows each of the support wings 50 to be folded upon itself when in the storage position as shown in FIG. 3 of the drawings.

As shown in FIGS. 2 and 3 of the drawings, a pair of end support members 54 are pivotally attached to the support wings 50. The end support members 54 preferably have an inverted U-shape as best shown in FIG. 2 of the drawings to support the end enclosures 60. A corresponding pair of connecting members 56 removably extend between the underside of the roof 26 to the mid-section of the end support members 54 to provide additional support to the end enclosures 60. The support wings 50 when fully extended rest upon the extended members 34 as shown in FIG. 2 of the drawings.

As shown in FIG. 1 of the drawings, middle enclosures 70 are attached between the roof 26 and the frame 20 within the middle portions of the frame 20. The middle enclosures 70 provide partial enclosure of the invention when the roof 26 is fully extended. As further shown in FIG. 1 of the drawings, a pair of end enclosures 60 are attached about the support wings 50, end support members 54, connecting members 56 and the roof 26 to provide a complete enclosure of the structure when fully extended.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A pickup truck folding camper system, comprising:
   a frame positionable within a bed of a pickup, wherein said frame includes an upper opening;
   a side opening within said frame;
   a plurality of telescoping support poles attached to said frame;
   a roof attached to said plurality of telescoping support poles opposite of said frame;
   a pair of support wings pivotally attached to opposing upper side portions of said frame, wherein said support wings extend outwardly with respect to said frame when extended and contract inwardly with respect to said frame when in a storage position;
   an enclosure structure for enclosing a space between said roof and said frame when said roof is elevated with respect to said frame; and
   a pair of support structures removably attachable to said pair of support wings for supporting said support wings in a substantially horizontal position when fully extended.

2. The pickup truck folding camper system of claim 1, including a plurality of corner jacks removably attached to said frame for supporting said frame above a ground surface.

3. The pickup truck folding camper system of claim 2, wherein said pair of support structures each include a pair of extended members removably attached to said opposing upper side portions of said frame, wherein said pair of support wings are supported by said extended members when said support wings are fully extended.

4. The pickup truck folding camper system of claim 3, wherein said pair of support structures each further includes a pair of support arms attachable to said plurality of corner jacks and extending upwardly to engage and support said extended members.

5. The pickup truck folding camper system of claim 4, including a cross member extending between each of said extended members.

6. The pickup truck folding camper system of claim 5, wherein each of said pair of support wings includes a hinge section centrally positioned to allowing folding of each of said pair of support wings upon themselves when in a storage position.

7. The pickup truck folding camper system of claim 6, including a partial door pivotally attached to said frame for enclosing said side opening.

8. The pickup truck folding camper system of claim 7, including a full door pivotally attached to said roof for enclosing said side opening and a space between said side opening and said roof.

9. The pickup truck folding camper system of claim 8, including a pair of end support members pivotally attached to a distal portion of each of said support wings.

10. The pickup truck folding camper system of claim 9, wherein each of said pair of end support members has an inverted U-shaped structure.

11. The pickup truck folding camper system of claim 10, including a pair of connecting members extending from said roof to said corresponding pair of end support members.

12. The pickup truck folding camper system of claim 11, wherein said enclosure structure is comprised of a pair of end enclosures surrounding said support wings and a pair of middle enclosures for enclosing a middle portion between said frame and said roof.

\* \* \* \* \*